No. 693,733. Patented Feb. 18, 1902.
S. P. MOULTON.
CAR COUPLING.
(Application filed July 1, 1901.)

(No Model.)

WITNESSES
Walter Allen
O. S. Heytman

INVENTOR
Susan P. Moulton,
by Herbert W. P. Jenner.
Attorney

UNITED STATES PATENT OFFICE.

SUSAN PAYSON MOULTON, OF SALEM, MASSACHUSETTS.

CAR-COUPLING.

SPECIFICATION forming part of Letters Patent No. 693,733, dated February 18, 1902.

Application filed July 1, 1901. Serial No. 66,672. (No model.)

*To all whom it may concern:*

Be it known that I, SUSAN PAYSON MOULTON, a citizen of the United States, residing at Salem, in the county of Essex and State of Massachusetts, have invented certain new and useful Improvements in Car-Couplings; and I do hereby declare the following to be a full, clear, and exact description of the invention, such as will enable others skilled in the art to which it appertains to make and use the same.

This invention relates to car-couplings; and it consists in the novel construction and combination of the parts hereinafter fully described and claimed.

Figure 1:
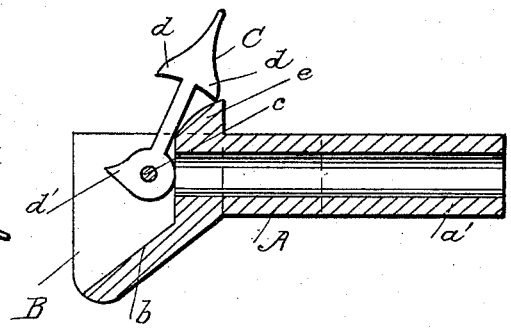
Figure 3:
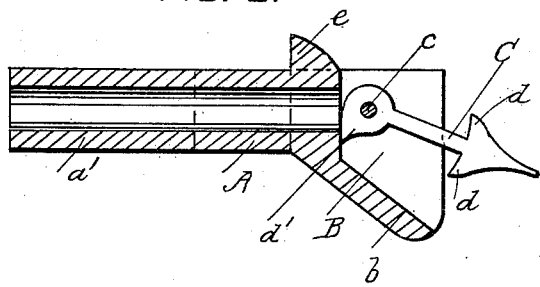
Figure 4:
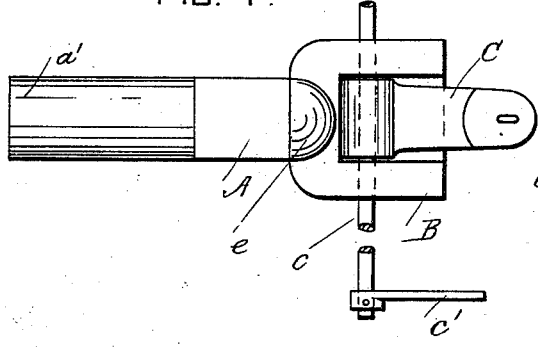
Figure 2:
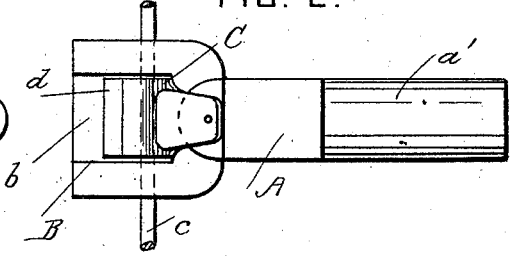

In the drawings, Figure 1 is a longitudinal section of one draw-head with the hook raised. Fig. 2 is a plan view of the same. Fig. 3 is a longitudinal section through the other draw-head with the hook lowered. Fig. 4 is a plan view of the same.

A is the draw-head of a railroad-car, provided with a shank $a'$ for attachment to the draw-bar in any approved manner.

B is a socket in the front part of the draw-head, which is provided with an upwardly and rearwardly inclined bottom $b$.

C is a double hook secured on a shaft $c$, which is journaled horizontally in the socket B, and provided with an operating-handle $c'$. The front portion of the double hook is wedge-shaped, and it is provided on its upper and lower sides with a hook $d$, which is adapted to engage with the hooked portion of the double hook of the opposed draw-head.

The double hook C is provided with a stop $d'$, projecting from its shank. This stop bears against the back of the socket and holds the hook a short distance above the inclined bottom $b$, as shown in Fig. 3.

A lug $e$ is provided at the top of the socket for the hook to rest on when in its raised position, as shown in Fig. 1.

When both hooks are lowered and two cars are caused to approach each other, the opposed hooks are coupled automatically either by striking against each other or against the inclined bottom $b$ of the socket.

The hooks are uncoupled by means of their shafts, which afford a means for raising whichever hook is uppermost without going between the cars.

What I claim is—

1. In a car-coupling, the combination, with a draw-head provided with a socket at its front end, of a double hook pivoted in the said socket and provided with a stop on its shank which bears against the rear end of the socket and supports the hook clear of the bottom of the socket, substantially as set forth.

2. In a car-coupling, the combination, with a draw-head provided with a socket at its front end having an upwardly and rearwardly inclined bottom, of a double hook pivoted in the said socket and provided with a stop on its shank which bears against the rear end of the socket and supports the hook clear of the bottom of the socket, substantially as set forth.

In testimony whereof I affix my signature in presence of two witnesses.

SUSAN PAYSON MOULTON.

Witnesses:
ALICE J. MURRAY,
FREDERICK K. DAGGETT.